3,673,842

March 25, 1975 A. V. SANCHEZ Re. 28,370

METHOD OF AND APPARATUS FOR REPAIRING DEFORMED YIELDABLE STRUCTURES

Original Filed Feb. 26, 1970 5 Sheets-Sheet 1

INVENTOR
ANASTACIO V. SANCHEZ

BY Jack M. Wiseman
ATTORNEY

INVENTOR
ANASTACIO V. SANCHEZ

BY Jack M. Wiseman
ATTORNEY

INVENTOR
ANASTACIO V. SANCHEZ
BY Jack M. Wiseman
ATTORNEY

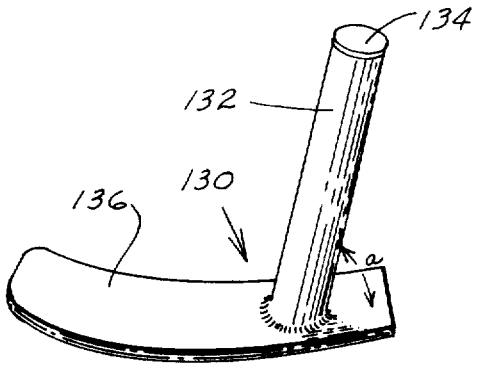
FIG 8
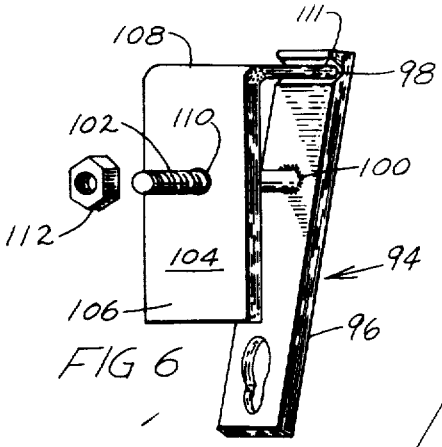
FIG 6
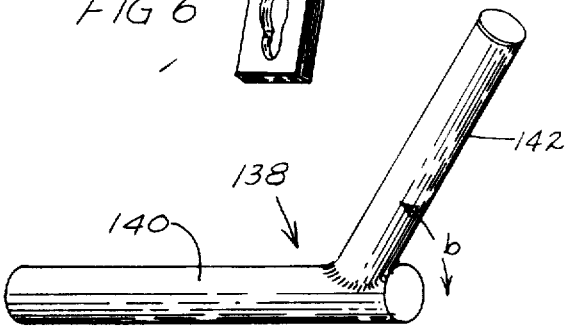
FIG 9
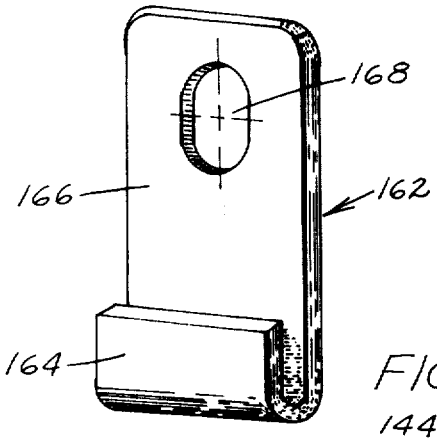
FIG 13
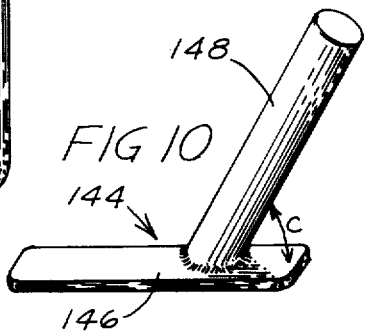
FIG 10
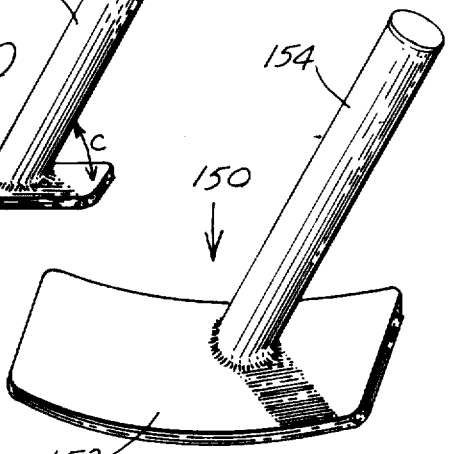
FIG 11
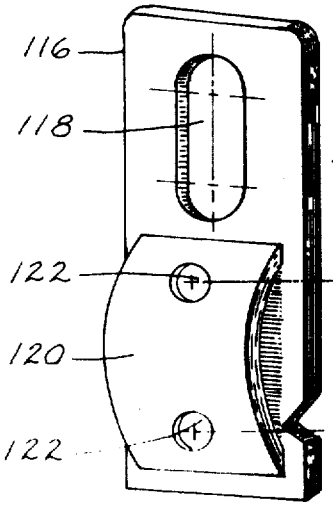
FIG 7
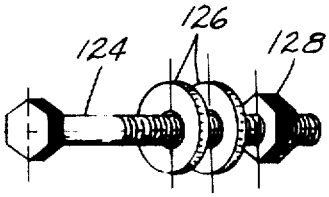
INVENTOR
ANASTACIO V. SANCHEZ
BY Jack M. Wiseman
ATTORNEY

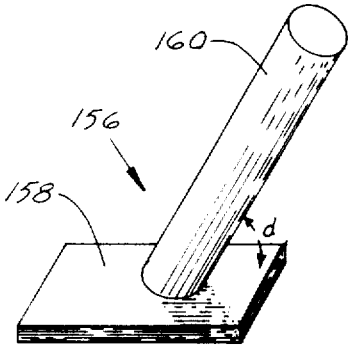
FIG 12
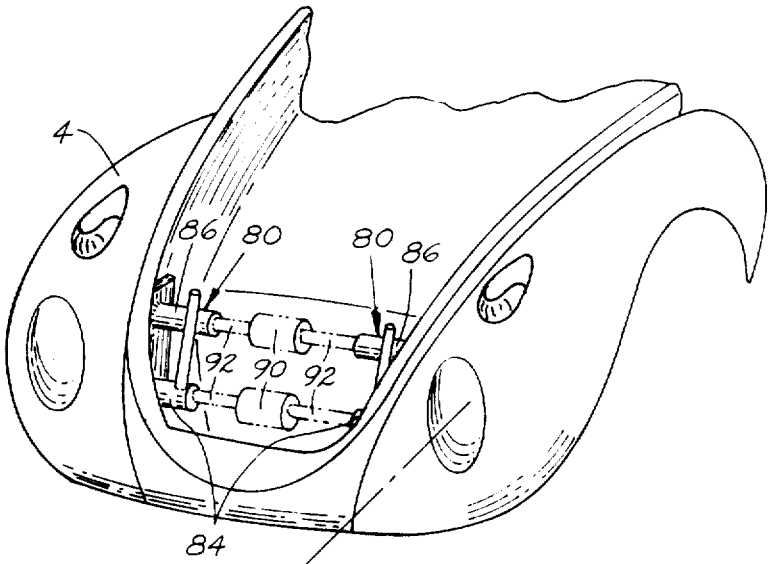
FIG 14
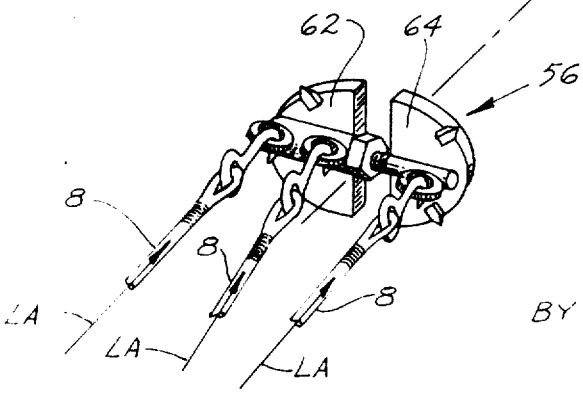
INVENTOR
ANASTACIO V. SANCHEZ
BY
Jack M. Wasserman
ATTORNEY United States Patent Re. 28,370
Reissued Mar. 25, 1975

28,370

METHOD OF AND APPARATUS FOR REPAIRING DEFORMED YIELDABLE STRUCTURES

Anastacio V. Sanchez, 10775 Foothill Blvd., Cupertino, Calif. 95014

Original No. 3,673,842 dated July 4, 1972, Ser. No. 14,558, Feb. 26, 1970. Application for reissue Aug. 27, 1973, Ser. No. 391,642
Int. Cl. B21d *1/12*
U.S. Cl. 72—293 21 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus for repairing vehicle bodies including placing a vehicle body to be repaired within a stall, engaging attachment tools with preshaped contour surfaces to the body about the area to be repaired, joining the tool to tension cable means guided by a select guide means to guide the cable along a desired line of action, and applying tension means to the cable means for placing the cable in tension at adjustable magnitudes along said line of action.

BACKGROUND OF THE INVENTION

The present invention relates to the repairing of deformed yieldable structures and more particularly vehicle bodies. With the continuous increase in the number of vehicle accidents, the demands for vehicle body repair continues to increase. Heretofore, a highly skilled repairman has been required to repair a damaged vehicle body. Considerable time and skill is required of the repairman. Many facets of the repair require the use of special tools and expertise of the repairman is realized only after long periods of training and experience. Accordingly, vehicle body repair is very costly and time consuming. In fact, it has become common practice to remove the deformed parts of the vehicle body assembly and replace them with new parts.

SUMMARY OF THE INVENTION

The present invention teaches an improved method and apparatus for repairing deformed yieldable structures, such as vehicle bodies. Application of the present teachings substantially lessens the costs, time and required skill over that of the known prior art. The first step in straightening bodies is to get the body back as nearly as possible to the original shape or contour. Thus, according to the present invention, a deformed vehicle body is placed within a body repair stall. Attachment tools of contour dependent upon the desired contour of the deformed area are engaged to the body about the deformed area. Tension cables are connected to the tools. The cables are guided along a select path establishing a line of action. The cables are joined to tension jacks thereby placing the cables under desired tension along the line of action. As the tension jacks are adjusted, forces are applied to the area of the body about the engaged tool and the area tends to assume a contour dependent upon the contour of the tool, line of action and magnitude of the tension.

BRIEF DESCRIPTION OF THE DRAWINGS

FIG. 6 is a perspective view of a drip molding clamp;

FIG. 7 is an exploded perspective view of a body and frame clamp assembly;

FIGS. 8–12 are perspective views of body spoon tools employed in the present invention;

FIG. 13 is a perspective view of a bumper pulling hook; and

FIG. 14 is a diagrammatic view of the attachment of FIG. 5 in position on an automobile body and the attachment of FIG. 4 in alignment with a headlamp opening.

DESCRIPTION OF PREFERRED EMBODIMENTS

Figure 1A:
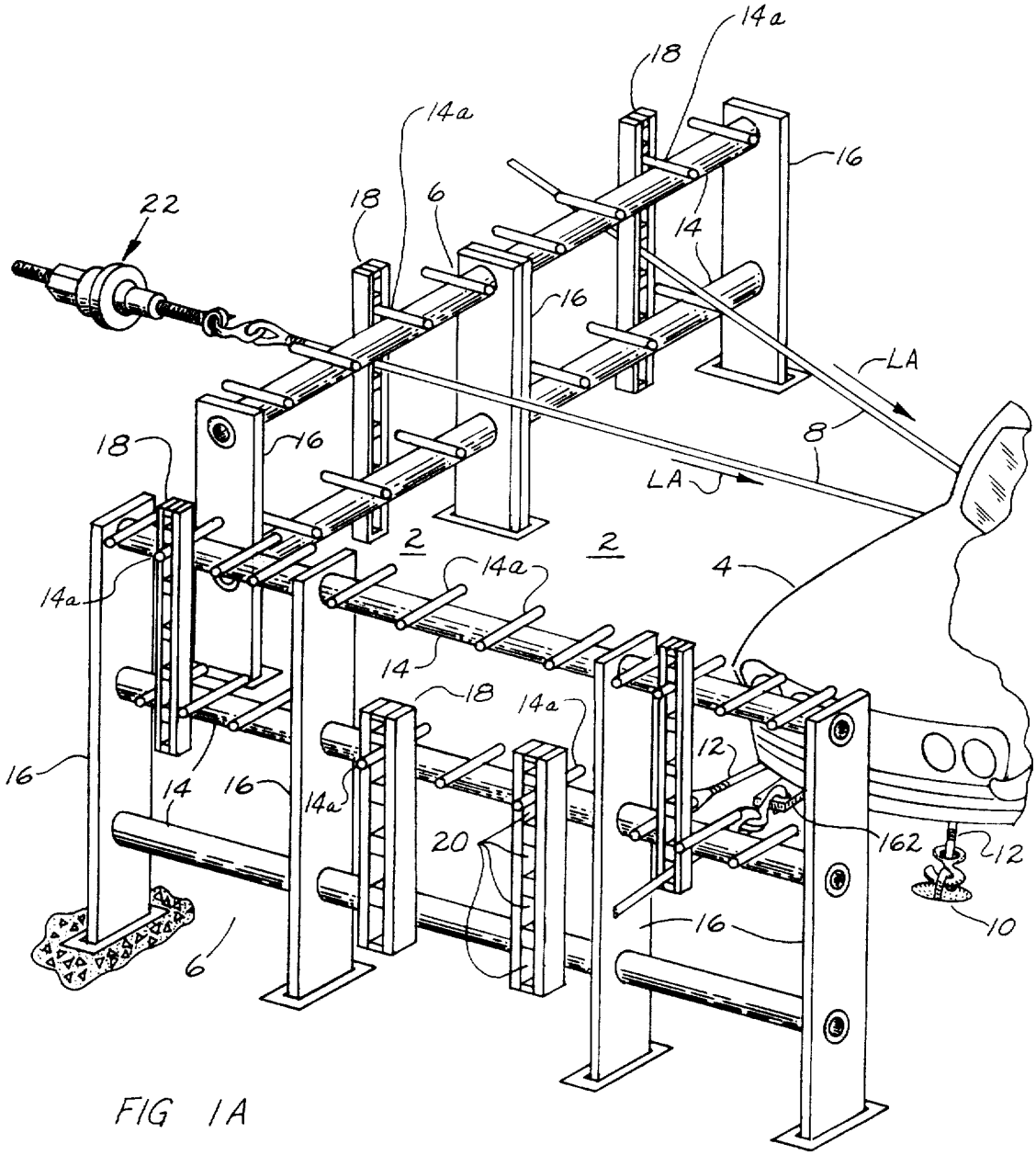
FIGS. 1A and 1B with FIG. 1B to the right of FIG. 1A are a perspective view of apparatus embodying the present invention.
Figure 15:
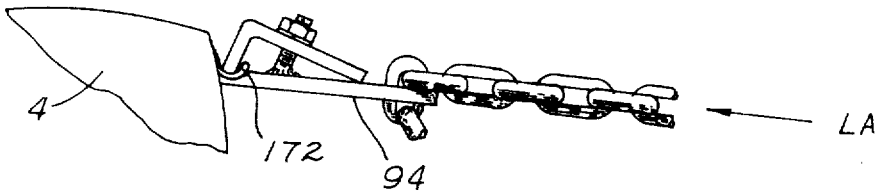
FIG. 15 is an end view of the drip molding clamp assembly.
Figure 1B:
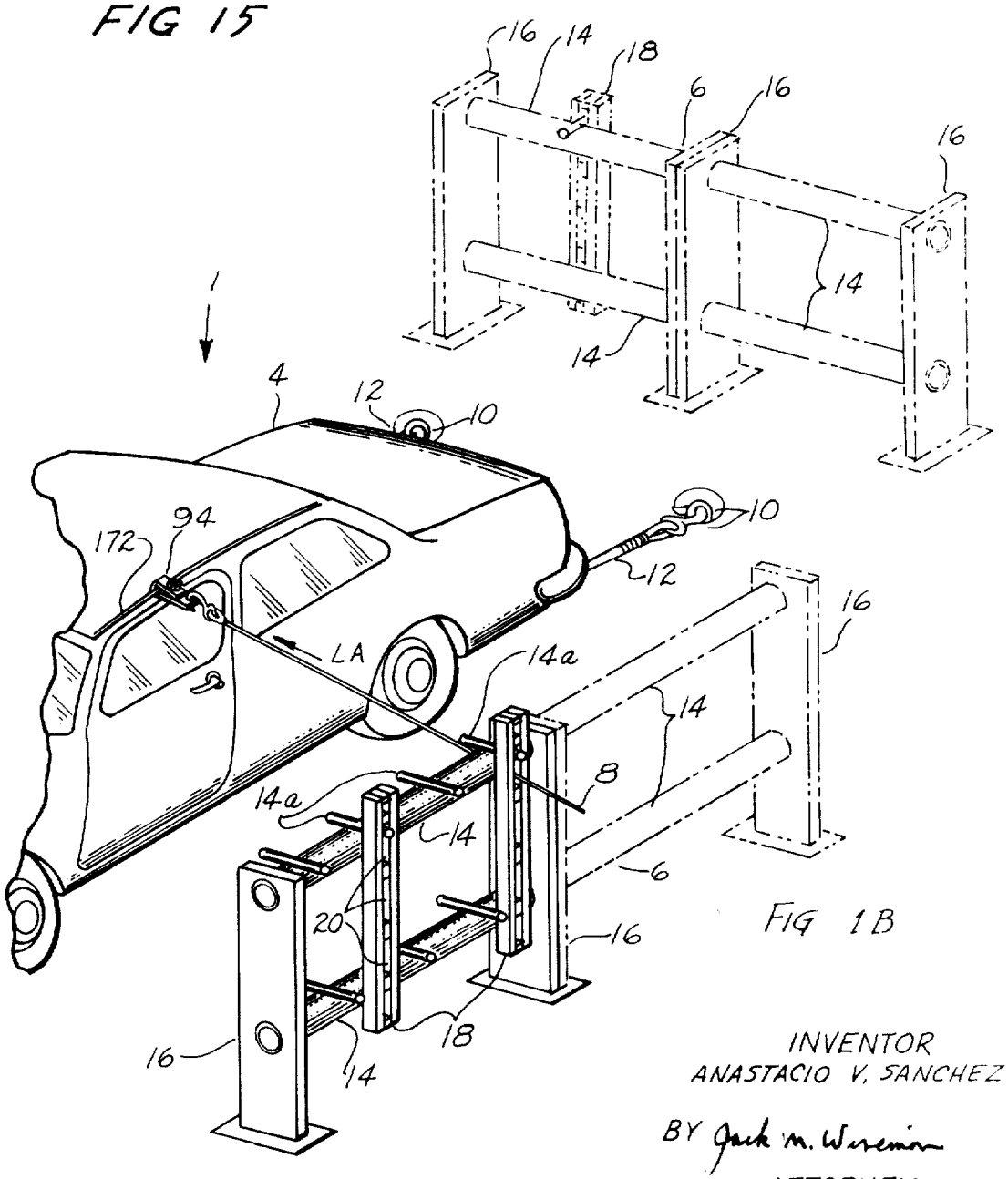

Illustrated in FIGS. 1A and 1B are apparatus of the present invention for repairing vehicle bodies. The apparatus, referred to by the general reference character 1 encompasses a stall area 2 in which an automobile body 4 to be repaired may be positioned. The outer periphery of the stall 2 is defined by rack means of the apparatus 1, which also includes a plurality of guide racks 6 each designed to guide a plurality of cables 8 in various vertical and horizontal planes relative to one another. A forward rack 6 is positioned to establish the forward part of the stall, left and right lateral racks 6 are poistioned to form the left and right sides of the stall 2 and an optional rear rack 6 is designed to be positioned to form the rear of the stall 2. Within the stall 2 there are a plurality of anchor rings or pins 10 firmly secured to or imbedded within the floor of the stall and joined to anchor cables 12 also joined to the automobile body 4 to be repaired so as to anchor the body 4 in place within the stall.

Viewing the various guide racks 6, each carries a plurality of horizontal guide bars 14 at various vertical heights to relative to the base or floor of the stall 2. The horizontal bars 14 of each rack 6 are supported vertically by a plurality of support columns 16 which are supported vertically from the floor. The horizontal bars 14 are interconnected by a plurality of vertical guide members 18 positioned and detachably secured substantially normal to the horizontal bars 14 by dowels or rods **14*a* fixed to the bars 14. Each member 18 carries a plurality of individual slots 20 through which a cable 8 may be guided. Accordingly, the line of action (LA) of a specific cable 8 may be established by selection of the guide rack 6, the horizontal bar 14 of the rack and the slot 20 of the select member 18**.

Figure 2:
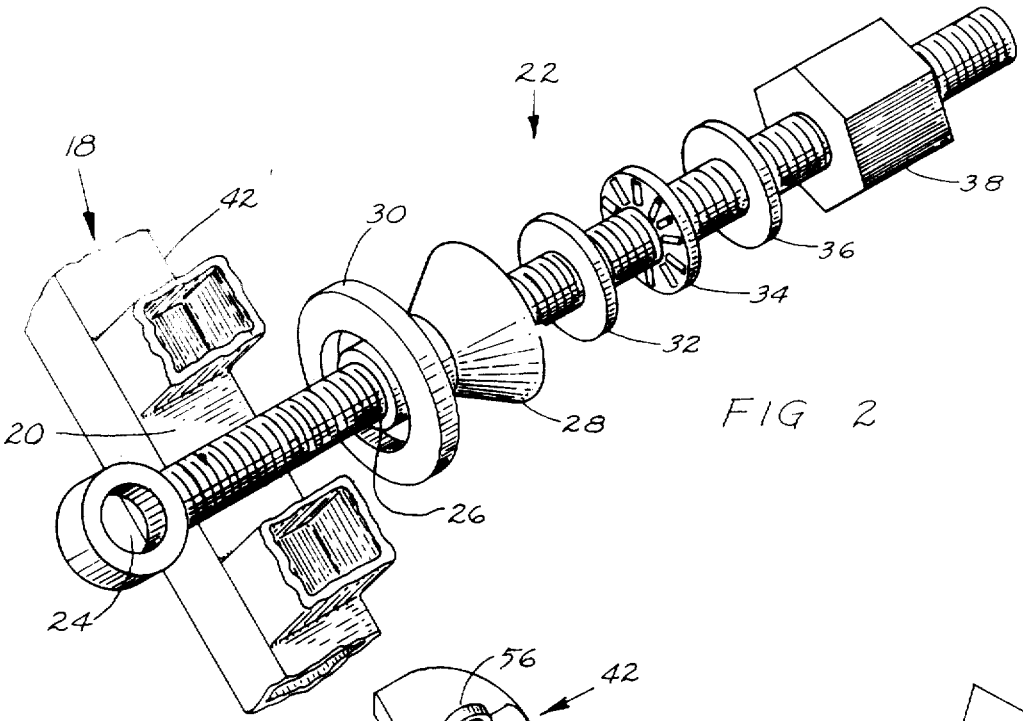
FIG. 2 is an enarged perspective view of a tension jack employed in the present invention.

On the outside of the stall area 2 the cables 8 are joined to an adjustable tension means in the form of a tension jack 22. Each of the cables 8 may be joined to a respective tension jack 22 to control the tension on the associated cable. FIG. 2 illustrates in further detail a tension jack 22. The jack 22 includes an eye 24 mounted at the end of a threaded tension bolt 26. The eye 24 is adapted to engage the end of a cable 8. Disposed about the bolt 26 is a load cone member 28 of which the internal surface is smooth such that the threaded bolt 26 may slide therethrough. Adapted to interlock with the load cone member 28 is a load washer 30 having an internal diameter less than the largest diameter of the member 28. Also supported about the shaft is a thrust washer 32, a thrust bearing 34, a washer 36 and a tension bolt take-up nut 38. Accordingly, the tension jack 22 may be guided through an aperture 20 in a support wall 42'. The support wall 42' is part of the upright member 18. The eye 24 extends beyond one side of the wall of the upright member 18 for engagement with a cable 8. The load cone 28 interlocks with the wall about the aperture 20 and extends about the other side of the wall of the upright member 18. The bearing 34 facilitates turning of the nut 38. Thus, as it is desired to apply tension to the attached cable, the lock-nut 38 is turned on the bolt 26. The tension may be increased or decreased by the turning of the nut 38.

To restore an automobile body, it is necessary to first take into consideration the original contour to which it is to be restored. Different models of automobiles have different contours and body lines. Doors, hoods, deck lids and the body proper of the same automobile have different contours. The contours include high crowns, low crowns, angles, flanges, U-channels, box sections and various other contours for providing physical strength and aesthetic attributes.

Figure 3:
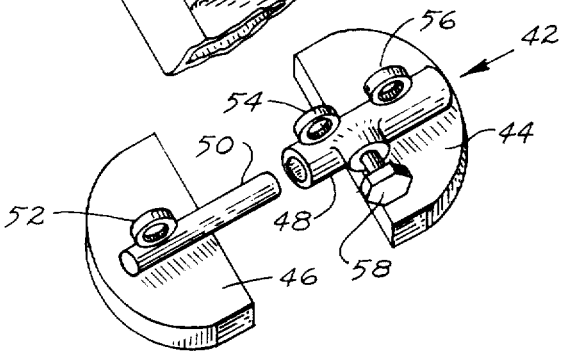
FIG. 3 is an exploded perspective view of an attachment tool for engaging an automobile body about a headlamp.

The apparatus 1 includes a plurality of different shaped attachment tools to be engaged with the automobile body. The contour of the attachment tools is dependent upon the point of engagement of the tool with the automobile and the desired contour of the body about the point of engagement. FIG. 3 illustrates a lamp attachment tool 42 to be engaged to the body about a lamp area. The tool 42 includes a pair of arcuate plates 44 and 46 complementary to one another. The plate 44 carries a female guide 48 permanently welded to the top surface. The plate 46 carries a male guide 50 mounted on a top surface and normal thereto and in alignment with the guide 48 of the plate 44. The male guide 50 carries an eye 52 and the female guide carries a pair of eyes 54 and 56 which eyes may be joined to cable means. Protruding from the side wall of the female guide 48 is a lock screw 58 which serves to allow adjustment of the span of the tool 42. Accordingly, the tool 42 may be positioned about a lamp cavity and the guides adjusted depending upon the size and shape of the lamp opening. By transmitting a force through the selected eyes by means of a cable in a direction so that the curved surfaces of the tool 42 selectively engage the housing or body surrounding the lamp cavity, the housing and body of the vehicle is restored to approach its original contour.

Figure 4:
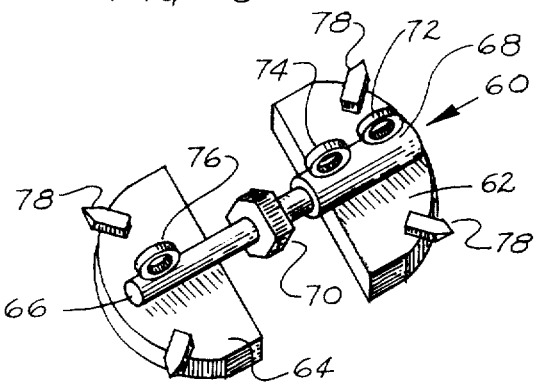
FIG. 4 is a perspective view of a modification of attachment tool shown in FIG. 3 for engaging an automobile body about a headlamp.

The attachment in FIG. 4 illustrates a modified lamp attachment tool 60. The tool 60 carries a pair of arcuate plates 62 and 64 complementary to one another. The plate 64 carries a threaded stud 66 and the plate 62 carries a threaded channel 68 both of which are positioned normal to their respective plates. Thus, the two plates may be interlocked relative to one another and the span adjusted. A lock-nut 70 is positioned about the stud to lock the plates once the span is adjusted. The channel member 68 carries a pair of eyes 72 and 74 and the stud 66 carries an eye 76. Each of the plates 62 and 64 carries a pair of pointed ears 78 extending beyond the periphery of their respective segments. The ears 78 are designed to engage a wall within the interior of the lamp cavity. FIG. 14 illustrates in further detail the relationship of the attachment 60 with the body 2 and joined to cables 8. The operation is similar to that described for the tool 42.

Figure 5:
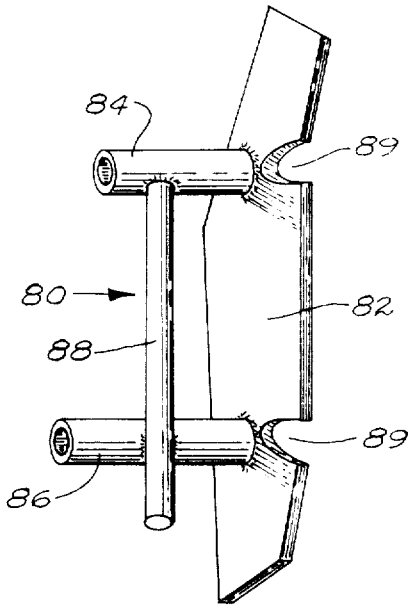
FIG. 5 is a perspective view of an attachment tool for engaging an automobile body about the interior of a cavity.

A cavity attachment tool 80 (FIG. 5) includes a plate 82 having a relatively flat outer surface. Extending laterally from the plate are a pair of cylinders or tubes 84 and 86. A cross support member 88 is secured to the cylinders 84 and 86. The plate 82 further carry a pajr of notches 89 opening to the peripheral edge. The notches 89 provide clearance from obstructing bolts. A pair of the cavity engaging attachment tools 80 (FIG. 14) may be spaced laterally relative to one another against the internal walls of a cavity such as the area under the hood of the body. The surface from which the cylinders 84 and 86 project are opposite from the structure engaging surface. The tools 80 are engaged by a pair of hydraulic expansion jacks 90 having a pair of pistons 92 adapted to engage within the cylinders 84 and 86. The span of the jacks 90 may be adjusted to control the expansion force and lateral distance. As illustrated by the broken lines (FIG. 14), the jacks 90 and tools 80 may be positioned and moved along the interior walls of a cavity, such as the area under the hood of a vehicle. Cables 8 may be joined to the member 88 and cylinders 84 and 86 to control movement along the walls. The tool 80 has been designed for small cars and is used in opposite pairs for spreading out collapsed front ends of the body and pull in a forward motion.

A drip molding clamp assembly 94 (FIG. 6) includes a base member 96 having a trough 98 near one longitudinal end. Extending through an aperture 100 within the base member 96 is a threaded bolt 102. A angle member 104 with a pair of legs 106 and 108 normal to one another is provided. The leg 106 is formed with an aperture 110 in alignment with the bolt 102. A terminal edge of the leg 108 is adapted to fit within the trough 98 of the member 96. A take-up nut 112 engages the bolt 102 such that adjustments between the angle member 104 and the base member 96 may be made. The exterior wall surface of a drip molding may be positioned within the trough 98 and the edge 111 within the interior surface of the molding to secure the clamp assembly in place.

FIG. 7 illustrates a body-frame clamp assembly 114 including a base member 116 having an oblong aperture 118 about one end to receive a cable. An arched clamp member 120 is included carrying a pair of apertures 122 for receiving a bolt member 124 carrying a pair of washers 126 and a take-up nut 128. Assembly 114 is adapted to inter-enagage with the frame or body of the automobile and a cable joined at the aperture 118. A plurality of the assemblies 114 may be used in various combinations.

Various body spoon types of tools are illustrated in FIGS. 8–12 which may be held by an operator adjacent to the body about the area to be repaired. The spoons serve as a back-up support when straightening disfigured metal by a hammer or the like. A spoon 130 of FIG. 8 includes a cylindrical stud 132 with a central aperture 134 and an arcuate flat plate member 136 secured thereto at an acute angle "a." The plate 136 is of narrow width relative to its length and carries arcuate peripheral edges. A spoon 138 of FIG. 9 carries a pair of cylindrical studs 140 and 142 joined together at an acute angle "b" relative to their respective longitudinal axis. A spoon 144 of FIG. 10 includes a flat rectangular base member 146 of relatively narrow cross section with a cylindrical stud 148 supported thereby and extending at an acute angle "c." A spoon 150 attachment of FIG. 11 includes a crowned plate 152 secured with a cylindrical stud 154. A spoon attachment 156 of FIG. 12 includes a short, rectangular flat plate 158 which may be of substantial width relative to its length and carry a cylindrical stud 160 supported thereby at an acute angle "d."

FIG. 13 illustrates a bumper clamp 162 comprising a unitary member shaped with an arm segment 164 and turned back over an arm segment 166. The arm 166 carries an oblong opening 168 for engagement with a cable.

FIG. 14 illustrates an embodiment of a front end of an automobile body in which a pair of the cavity attachment tools 180 are positioned laterally within the cavity beneath a hood and against the side walls of the cavity. The tools 80 are each engaged by a pair of hydraulic jacks 90 to apply lateral forces and to urge the cavity walls outward and can be urged to move the forward direction.

In operation, an automobile body to be repaired is placed within the stall 2 and the anchor cables 12 tied to the body to secure it in place. Preferably, anchor cables 12 are secured to the front, rear and sides of the body. Next, depending upon the area of the body to be repaired, the desired attachment tools are secured to the body and to an appropriate cable member 8. The cable member 8 is then guided over the guide rack means in a select guide to provide the desired line of action (LA) of the force exerted by the tool against the body. The magnitude of the force along the line of action (LA) is adjusted by controlling the tension jack 22 associated with the particular cable 8.

Assuming that the body 4 is deformable, the deformation depends upon the amount of tension applied to the cable, the line of action (LA) of the cable and the contour of the attachment tool. Depending upon the nature of the repair to be completed, a number of attachment tools may be simultaneously engaged to various parts of the body. The deformation then is further dependent upon the lines of action, magnitude of tension and contour of the various attachment tools relative to one another. FIG. 14 further illustrates application of the present system about the front part of the body. The cavity attachment tools, as previously discussed, apply a lateral force against the interior surfaces of the side walls to urge them outwardly. The magnitude of the lateral forces is dependent upon the adjustments of the jack members. This arrangement can be also used to move the walls outwardly and forwardly. FIG. 4 further illustrates that to straighten the housing about the headlamps, the lamp atachment member 60 may be secured wihin the cavity in which the headlamp is to be supported. This arrangement may also be employed for straightening a deformed fender associated with the headlamp. The span between the segments 62 and 64 is adjusted and then the cables 8 are secured to the eyes 72, 74 and 76. The tension on each of the cables 8 may then be controlled along the line of action (LA) according to the tension on the jacks 22 tied to the cable. The molding clamp 94 may be engaged to and secured with a drip molding 172 about an automobile as illustrated in FIG. 1B. The clamp assembly 94 may be joined to a cable 8 to secure it in place or to move it along the molding trough. Likewise, the various other attachment tools may be joined to the body and cable means to exert forces on the body.

I claim:

1. Apparatus for repairing a deformed yieldable structure comprising, in combination:

cable guide means positioned for repairing a deformed yeildable structure[;] , said cable guide means comprising guide members, each of said guide members having a plurality of guide slots for receiving and guiding cables *simultaneously* along a plurality of different planes;

a plurality of cables received by *one of* said guide members to be guided along various lines of action;

preshaped attachment tools adapted for engagement with the deformed yieldable structure and secured to said cables, the attachment tools having desired surface contours dependent upon the desired contour of the yieldable structure about the area of engagement between the tool and the yieldable structure; and adjustable tension means connected to [at least one] *each* of said cables *respectively* for applying tension to the [cable] *cables individually* to urge the attachment tool secured thereto into engagement with the deformed yieldable structure.

2. The apparatus of claim 1 in which said guide means includes a guide rack with a plurality of horizontal guide bars displaced vertically relative to one another to support said guide members, *said guide means comprising means supported by at least one of said horizontal guide bars and received by at least one of said slots of said one guide member for supporting said one guide member.*

3. The apparatus of claim 2 in which said guide racks are disposed in a substantial U-shaped pattern.

4. The apparatus of claim 2 in which said guide racks are disposed to define a quadrature.

5. The apparatus of claim 2 and further including means for anchoring the body to be repaired.

6. The apparatus of claim [2] *1* in which the adjustable tension means is connected to said cables to control the tension of each of said cables independent from the tension of other of said cables.

7. The apparatus of claim 6 in which the adjustable tension means includes a plurality of individual tension jacks each joined to a cable.

8. The apparatus of claim 6 in which the tension jacks are adapted to be operated independent of one another.

9. The apparatus of claim 8 in which the tension jacks are anchored to a supporting surface.

10. A preshaped attachment tool adapted for engagement with a yieldable structure comprising a plate with structure engaging surface, spaced apart hollow members projecting perpendicularly from said plate at a surface thereof opposite from the structure engaging surface, said hollow members being arranged for receiving respectively a piston [and] *of* a jack for applying a force to said plate to urge the structure engaging surface thereof toward the yieldable structure.

11. A preshaped attachment tool as claimed in claim 10 wherein a cross member is connected to said hollow members for attachment to a cable.

12. A presharped attachment tool as claimed in claim 11 wherein said plate is formed with notches along an edge thereof to provide clearance for obstructing bolts.

*13. Apparatus for repairing a deformed yieldable structure comprising, in combination:*

*cable guide means positioned for repairing a deformed yieldable structure, said cable guide means comprising guide members, each of said guide members having a plurality of guide slots for receiving and guiding cables simultaneously along a plurality of different planes;*

*a plurality of cables received by one of said guide members to be guided along various lines of action;*

*means adapted for engagement with the deformed yieldable structure and secured to said cables; and*

*adjustable tension means connected to each of said cables for applying tension to the cables respectively to urge said means secured thereto into engagement with the deformed yieldable structure.*

*14. The apparatus of claim 13 in which said guide means includes a guide rack with a plurality of horizontal, guide bars displaced vertically relative to one another to support said guide members, said guide means comprising means supported by at least one of said horizontal bars and received by at least one of said slots of said one guide member for supporting said one guide member.*

*15. The apparatus of claim 14 in which said guide racks are disposed in a substantial U-shaped pattern.*

*16. The apparatus of claim 14 in which said guide racks are disposed to define a quadrature.*

*17. The apparatus of claim 14 and further including means for anchoring the body to be repaired.*

*18. The apparatus of claim 13 in which the adjustable tension means is connected to said cables to control the tension of each of said cables independent from the tension of other of said cables.*

*19. The apparatus of claim 18 in which the adjustable tension means includes a plurality of individual tension jacks each joined to a cable.*

*20. The apparatus of claim 18 in which the tension jacks are adapted to be operated independent of one another.*

*21. The apparatus of claim 20 in which the tension jacks are anchored to a supporting surface.*

References Cited

The following references, cited by the Examiner, are of record in the patented file of this patent or the original patent.

UNITED STATES PATENTS

| | | | |
|---|---|---|---|
| 3,122,194 | 2/1964 | Bronson et al. | 72—705 |
| 3,269,169 | 8/1966 | Latuff et al. | 72—705 |
| 3,590,623 | 7/1971 | Hunnicutt | 72—302 |
| 3,377,834 | 4/1968 | Latuff et al. | 72—705 |

(Other references on following page)

UNITED STATES PATENTS

| | | | |
|---|---|---|---|
| 2,717,020 | 9/1955 | Dobias | 72—705 |
| 3,149,659 | 9/1964 | Bogert et al. | 72—705 |
| 2,725,917 | 12/1955 | Kauppi | 72—705 |
| 3,589,680 | 6/1971 | Kuhn | 72—705 |
| 2,010,713 | 8/1935 | Countryman | 72—705 |
| 2,151,063 | 3/1939 | Weaver | 72—705 |
| 2,901,022 | 8/1959 | Wilkerson | 72—705 |
| 3,206,966 | 9/1965 | Fagan et al. | 72—705 |
| 3,214,959 | 11/1965 | Bowden | 72—705 |
| 2,165,504 | 7/1939 | Pfauser | 72—705 |

| | | | |
|---|---|---|---|
| 2,185,550 | 1/1940 | Coerdes | 72—705 |
| 2,597,103 | 5/1952 | Johnson et al. | 72—705 |
| 3,276,237 | 10/1966 | Transue | 72—705 |

CHARLES W. LANHAM, Primary Examiner

M. J. KEENAN, Assistant Examiner

U.S. Cl. X.R.

72—306, 705